No. 627,298. Patented June 20, 1899.
T. H. DEETER.
KAFIR CORN HARVESTER.
(Application filed Jan. 18, 1899.)
(No Model.)
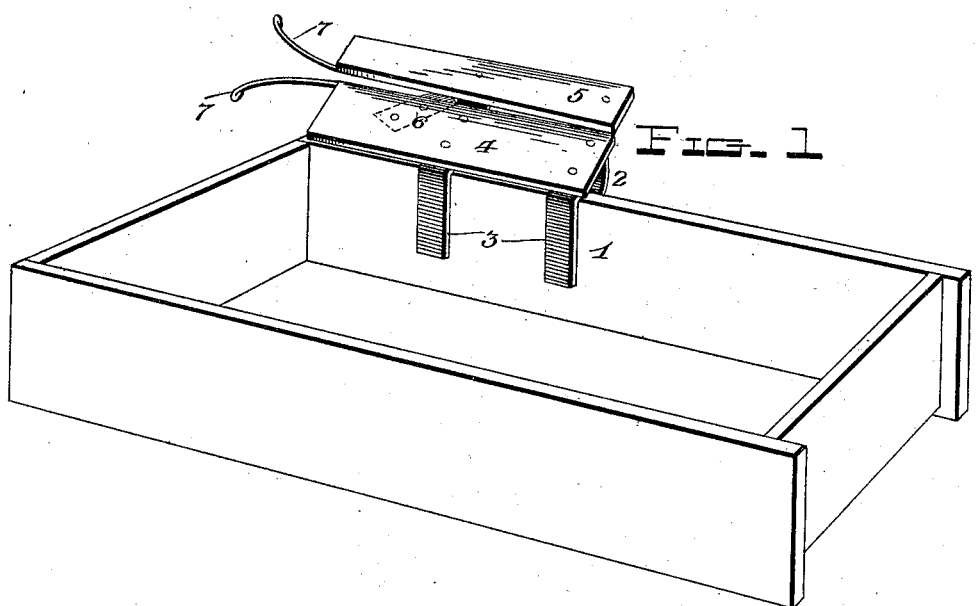
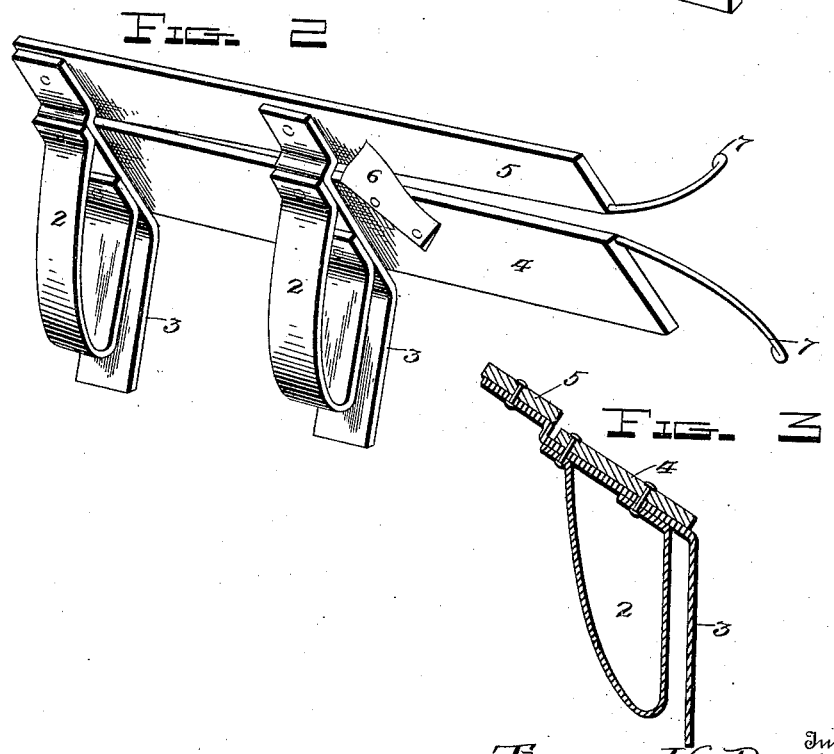
Witnesses
Inventor
Thomas H. Deeter,
by
H. B. Willson &co
Attorneys
THE NORRIS PETERS CO., PHOTO-LITHO., WASHINGTON, D. C.

UNITED STATES PATENT OFFICE.

THOMAS H. DEETER, OF EL DORADO, KANSAS.

KAFIR-CORN HARVESTER.

SPECIFICATION forming part of Letters Patent No. 627,298, dated June 20, 1899.

Application filed January 18, 1899. Serial No. 702,527. (No model.)

*To all whom it may concern:*

Be it known that I, THOMAS H. DEETER, a citizen of the United States, residing at El Dorado, in the county of Butler and State of Kansas, have invented certain new and useful Improvements in Kafir-Corn Harvesters; and I do declare the following to be a full, clear, and exact description of the invention, such as will enable others skilled in the art to which it appertains to make and use the same.

My invention relates to a novel device for harvesting the heads of such grain as Kafir corn, sugar-cane, Indian corn, and the like; and the object is to provide a simple, inexpensive, and effective device for rapidly and economically accomplishing this purpose.

To this end the invention resides in the construction, combination, and arrangement of the several elements of the device, as will be hereinafter more fully described, and particularly pointed out in the claim.

In the accompanying drawings the same reference characters indicate the same parts of the invention.

Figure 1 is a perspective view of my improved harvester as it appears in use on a wagon-body. Fig. 2 is a similar view of the device removed from the vehicle. Fig. 3 is a transverse section.

In the drawings, 1 denotes one of the vertical sides of the wagon-body, and 2 2 denote brackets formed with parallel spring-arms 3 3 to engage the side 1 of the vehicle.

4 denotes a guard-plate supported by the brackets, and 5 a corresponding parallel plate also fixed to the outer ends of said brackets to extend slightly above the plane of the plate 4, the contiguous edges of the plates being separated a short distance at their forward ends, from which point they gradually converge to their rear or meeting edges.

6 designates the cutter-blade, fixed to the under side of the guard-plate 4, so that its cutting edge extends diagonally across the space between the contiguous edges of the plates 4 and 5, and consequently in the path of the stalks of the grain as they pass between said plates.

7 7 denote the wire guard-fingers, fixed to the forward ends of the guard-plates to conduct the stalks or heads of the grain between the guard-plates.

The manner of using the harvester is as follows: The device is attached to the side-board of a vehicle-body—such, for example, as an ordinary wagon-box—which is driven along a row of standing grain, so that the stalks will pass between the guard-fingers and be conducted between the plates 4 and 5, and coming in contact with the knife-blade 6 the heads are severed and fall on the inclined faces of said guard-plates, whence they fall by gravity into the wagon-box.

It will be understood that various changes in the form, proportion, and the minor details of construction may be resorted to without departing from the principle or sacrificing any of the advantages of this invention.

Having thus described my invention, what I claim, and desire to secure by Letters Patent, is—

In a harvester of the class described, the combination with the vehicle of the inclined guard-plates, and the knife extending across their contiguous converging edges, and means for removably securing said plates to the vehicle, said means consisting of the brackets 2, formed with the parallel spring-arms 3, substantially as shown and described.

In testimony whereof I have hereunto set my hand in presence of two subscribing witnesses.

THOMAS H. DEETER.

Witnesses:
L. V. OLIN,
A. M. BRUMBACK.